United States Patent
Hamada et al.

(10) Patent No.: US 7,504,799 B2
(45) Date of Patent: Mar. 17, 2009

(54) BATTERY PACK

(75) Inventors: Shinji Hamada, Toyohashi (JP); Toyohiko Eto, Toyota (JP); Yoshiaki Ogata, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 270 days.

(21) Appl. No.: 11/218,622

(22) Filed: Sep. 6, 2005

(65) Prior Publication Data

US 2006/0049799 A1    Mar. 9, 2006

(30) Foreign Application Priority Data

Sep. 6, 2004    (JP)    ............................ 2004-258305

(51) Int. Cl.
*H02J 7/00* (2006.01)
*H01M 10/50* (2006.01)

(52) U.S. Cl. ........................ 320/107; 320/112; 429/120; 429/159; 429/164

(58) Field of Classification Search ................. 320/112, 320/107; 429/99, 159, 120, 15
See application file for complete search history.

(56) References Cited

U.S. PATENT DOCUMENTS 6,555,264 B1 * 4/2003 Hamada et al. ............. 429/156
6,818,343 B1 * 11/2004 Kimoto et al. ................ 429/99

FOREIGN PATENT DOCUMENTS

| JP | 5-90816 | 12/1993 |
| JP | 10-003950 | 1/1998 |
| JP | 2000-182582 | 6/2000 |
| JP | 2000-251954 | 9/2000 |
| JP | 2001-035548 | 2/2001 |

* cited by examiner

*Primary Examiner*—Akm E Ullah
*Assistant Examiner*—Yalkew Fantu
(74) *Attorney, Agent, or Firm*—Finnegan, Henderson, Farabow, Garrett & Dunner, LLP

(57) ABSTRACT

A battery pack 100 has plural battery modules 110 each of which constituted with plural unit cells 120 arranged in a row. Furthermore, a spacer 130 intervenes between adjoining battery modules 110 to constitute a cooling passage 160 which makes cooling medium flow and cools down the unit cells 120. The spacer 130 is designed to flow the cooling medium in a row direction of unit cell cases 121 integrated in a battery module 110. The spacer 130 is structured such that touch area of the cooling medium and the unit cell cases 121 becomes lager as going from inlet side to outlet side of the cooling passage 160 with respect to each of the plural battery modules 110.

12 Claims, 10 Drawing Sheets

BATTERY PACK

BACKGROUND OF THE INVENTION

1. Field of the Invention

The present invention relates to a battery pack structured with plural battery modules each of which is constituted by plural unit cells arranged in a row. More particularly, it relates to a battery pack with a spacer which intervenes and constitutes a cooling medium passage for flowing cooling medium between adjoining battery modules.

2. Description of Related Art

There has conventionally been known a battery pack structured such that plural unit cells are integrated in the battery pack and cooling medium flows between adjoining unit cells. For example, Japanese Unexamined Patent Publication (Kokai) No. 2000-251954 discloses a battery pack like that. In this battery pack, plural unit cells are arranged and cooling medium passages (cooling passages) are arranged at both sides in relation to direction the unit cells are arranged. Significant number of protrusions are provided on adjoining wall surfaces of adjoining battery jars (battery cases) and made to contact with each other, whereby the cooling medium passages are formed between the adjoining wall surfaces. A lid body is provided on the battery pack, and there are formed an inlet orifice for supplying the lid body cooling medium and an outlet orifice for exhausting cooling medium (see FIG. 1 and corresponding description portion of Japanese Unexamined Patent Publication (Kokai) No. 2000-251954). In such a battery pack, cooling medium supplied from the inlet orifice is flowed in the cooling medium passage and exhausted from the outlet orifice. When flowing, the cooling medium touches those battery jars and cools down the unit cells flowing in an up-and-down direction of each unit cell (a direction orthogonal to a row direction of the unit cells).

Other than the above publication, Japanese Unexamined Utility Model Publication (Kokai) No. H5(1993)-90816, Japanese Unexamined Patent Publication (Kokai) No. 2000-182582, Japanese Unexamined Patent Publication (Kokai) No. 2001-35548, and Japanese Unexamined Patent Publication (Kokai) No. H10(1998)-3950 disclose the related art.

The battery pack directed to Kokai No. 2000-251954 is structured such that cooling medium is flowed in an up-and-down direction of each unit cell for cooling down each unit cell. Therefore, the lid body is provided on a top portion of the battery pack and the passage for flowing the cooling medium is provided between the top portion of the unit cell and the lid body. Since height of the battery pack becomes taller by just much of providing the passage on the top portion of the battery pack, shortening of the battery pack cannot be realized.

Furthermore, unit cells arranged on inlet orifice side are cooled down by cooling medium in low temperature state. However, since the cooling medium becomes warmer as flowing in the cooling medium passage, unit cells on outlet orifice side are cooled down with warm cooling medium. That is, unit cells on inlet orifice side are well cooled down while unit cells on outlet orifice side are not cooled down as much as inlet orifice side. Therefore, cooled-down state is not uniform by each unit cell.

Kokai No. H10(1998)-3950 considers relation of cooling medium and batteries for cylindrical batteries to be integrated in a battery pack. However, there is no need to consider a problem on expansion of battery jars with reference to cylindrical batteries, which means technical thought is quite different.

SUMMARY OF THE INVENTION

The present invention has been made in view of the above circumstances and has an object to overcome the above problems and to provide a battery pack of which unit cells are shortened and can be cooled down uniformly.

According to a first aspect of the present invention, there is provided a battery pack comprising: plural battery modules each of which constituted with plural rectangular unit cells arranged in a row, the battery modules being arranged such that unit cell cases of the unit cells integrated in a battery module face to unit cell cases of the unit cells integrated in an adjoining other battery module taking a space; and a spacer intervening between adjoining battery modules, the space constituting a cooling passage which makes cooling medium flowing between the adjoining battery modules touches each of the unit cell cases for the adjoining battery modules, wherein the spacer is structured such that: the cooling medium flows in a row direction of the unit cell cases belonging to the battery module, and touch area of the cooling medium and the unit cell cases becomes lager as going from inlet side to outlet side of the cooling passage with respect to each of the plural battery modules.

In the above-mentioned conventional battery pack, cooling medium is flowed in an up-and-down direction of a unit cell for cooling down unit cells. Therefore, it is needed to provide a passage for flowing the cooling medium on a top portion of the battery pack and shortening of a battery pack cannot be realized.

On the other hand, in the present invention, a spacer forming a cooling passage is intervened between adjoining battery modules each of which constituted by arranging plural unit cells in a row. The spacer is designed to make cooling medium flow in a row direction of unit cell cases belonging to a battery module. Such structure eliminates the need for providing a cooling medium passage on top portion of a battery pack like conventional art. Therefore, shortening of a battery pack can be intended more effectively than the conventional battery pack.

However, in case cooling medium is designed to flow in a row direction of unit cell cases, unit cells arranged at inlet side of a cooling passage are cooled down with cooling medium in comparatively low temperature and temperature of cooling medium rises as flowing in a cooling passage. As a result, unit cells at outlet side are cooled down with cooling medium warmed in the course of flowing Therefore, the unit cells at inlet side of the cooling passage are well cooled down while unit cells at outlet side are not cooled down as much as the inlet side. Accordingly, cooled-down state is not uniform by each unit cell.

On the other hand, in the first aspect of the present invention, the spacer is structured such that touch area of the cooling medium and the unit cell cases becomes lager as going from inlet side to outlet side of the cooling passage with respect to each of the battery modules. With such structure, unit cells arranged even closer to the inlet side of the cooling passage are cooled down by the cooling medium in comparatively low temperature with comparatively smaller touch area whereas unit cells arranged even closer to the outlet side of the cooling passages are cooled down by the cooling medium in warmed-up state with comparatively larger touch area. Therefore, each of the unit cells can be cooled down uniformly regardless of unit cells location.

The inventive battery pack thus makes it possible to shorten the battery pack itself and cool down unit cells uniformly.

A unit cell case herein may be made of resin or metal or alternatively, partially made of resin or metal.

A battery module may be structured with plural unit cells arranged in a row and the number of unit cells to be integrated in a battery module is not particularly restricted. Furthermore, the number of battery modules to be integrated in a battery pack must be plural but not particularly restricted.

As long as the above requirements are satisfied, any design of the spacer may be acceptable, i.e., a spacer structured with single-piece- or plural pieces, whichever may be acceptable. Furthermore, material of the spacer is not particularly restricted, i.e., it may be made of resin or metal or alternatively, partially made of resin or metal. Still further, the spacer is essentially structured such that touch area of cooling medium and the unit cell cases becomes larger as going from inlet side to outlet side of the cooling passage, however, the touch area may be made larger stepwise by unit cell in a row direction or alternatively, made larger gradually along the row direction.

According to a second aspect of the present invention, there is provided a battery pack comprising: plural battery modules each of which constituted with plural rectangular unit cells arranged in a row, the battery modules being arranged such that unit cell cases of the unit cells integrated in a battery module face to unit cell cases of the unit cells integrated in an adjoining other battery module taking a space; and a spacer intervening between adjoining battery modules, the spacer constituting a cooling passage which makes cooling medium flowing between the adjoining battery modules touches each of the unit cell cases for the adjoining battery modules, wherein the spacer is structured such that: the cooling medium flows in a row direction of the unit cell case belonging to the battery module, and contact area of the spacer itself and the unit cell cases becomes smaller as going from inlet side to outlet side of the cooling passage with respect to each of the plural battery modules.

Similar to the first aspect, in the second aspect of the present invention, a spacer forming a cooling passage is intervened between adjoining battery modules each of which constituted by arranging plural unit cells arranged in a row. The spacer is designed to make cooling medium flow in a row direction of unit cell cases belonging to a battery module. Such structure eliminates the need for providing a cooling medium passage on top portion of a battery pack like conventional art. Therefore, shortening of a battery pack can be intended more effectively than the conventional battery pack.

However, similar to the first aspect, in the second aspect of the present invention also, in case cooling medium is designed to flow in a row direction of unit cell cases, unit cells at inlet side of a cooling passage are well cooled down while unit cells at outlet side are not cooled down as much as the inlet side. Accordingly, cooled-down state is not uniform by each unit cell, as mentioned in the above.

On the other hand, in the second aspect of the present invention, the spacer is structured such that contact area of the spacer itself and the unit cell cases becomes smaller as going from inlet side to outlet side of the cooling passage with respect to each of the battery modules. Accordingly, touch area of the cooling medium and the unit cell cases becomes larger as going from inlet side to outlet side of the cooling passage. Therefore, with such structure, unit cells arranged even closer to the inlet side of the cooling passage are cooled down by the cooling medium in comparatively low temperature with comparatively smaller touch area whereas unit cells arranged even closer to the outlet side of the cooling passages are cooled down by the cooling medium in warmed-up state with comparatively larger touch area. Therefore, each of the unit cells can be cooled down uniformly regardless of unit cell's location.

The battery pack directed to the second aspect of the present invention also makes it possible to shorten the battery pack itself and cool down unit cells uniformly.

Furthermore, as to the above-mentioned any aspects of the inventive battery pack, of the cooling passage, cross-sectional area orthogonal to the row direction is preferably made generally constant from the inlet side to the outlet side.

In case cross sectional area differs by portion significantly, the flow of cooling medium deteriorates and it results in lowering of ability to cool down unit cells.

On the other hand, in the present invention, cross-sectional area of the cooling passage is made generally constant from the inlet side to the outlet side. Therefore, the flow of cooling medium becomes smooth and ability to cool down unit cells can be improved.

Furthermore, as to the above-mentioned any aspects of the inventive battery pack, for each of the unit cell cases, at least one of portions facing to the cooling passage is preferably made of metal, and the spacer has electrical insulation characteristics.

In case any parts of a unit cell facing to cooling passage are made of metal and a spacer is made of metal, it may cause short-circuit between adjoining unit cells, and the like.

On the other hand, in the present invention, even though at least one of portions of each unit cell facing to the cooling passage is made of metal, the spacer has electrical insulation characteristics. Therefore, short-circuit between adjoining unit cells can surely be avoided.

Furthermore, as to the above-mentioned any aspects of the inventive battery pack, the spacer preferably has an anti-narrowing portion which prevents the cooling passage from narrowing due to expansion of the unit cell cases when the unit cell cases expand.

Unit cells expand along charging/discharging. When unit cells expand, a space between adjoining unit cells becomes small by just that much of expansion, whereby the flow of cooling medium becomes poor and ability to cool down unit cells deteriorates.

On the other hand, in the present invention, the spacer intervenes between adjoining unit cell cases and the spacer has an anti-narrowing portion which prevents the cooling passage from narrowing due to expansion of the unit cell cases when the unit cell cases expand. Therefore, even though unit cells expand along charging/discharging, the spacer's anti-narrowing portion can prevent the cooling passage from narrowing. Thereby, the flow of cooling medium can surely be secured and ability to cool down unit cells can be improved.

As long as the above requirements are satisfied, any design of the anti-narrowing portion may be acceptable. For example, an anti-narrowing portion may have a wall-like shape or columnar shape designed to extend perpendicular to and between the surfaces of adjoining unit cell cases facing to a cooling passage so that the anti-narrowing portion comes into contact with those surfaces.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
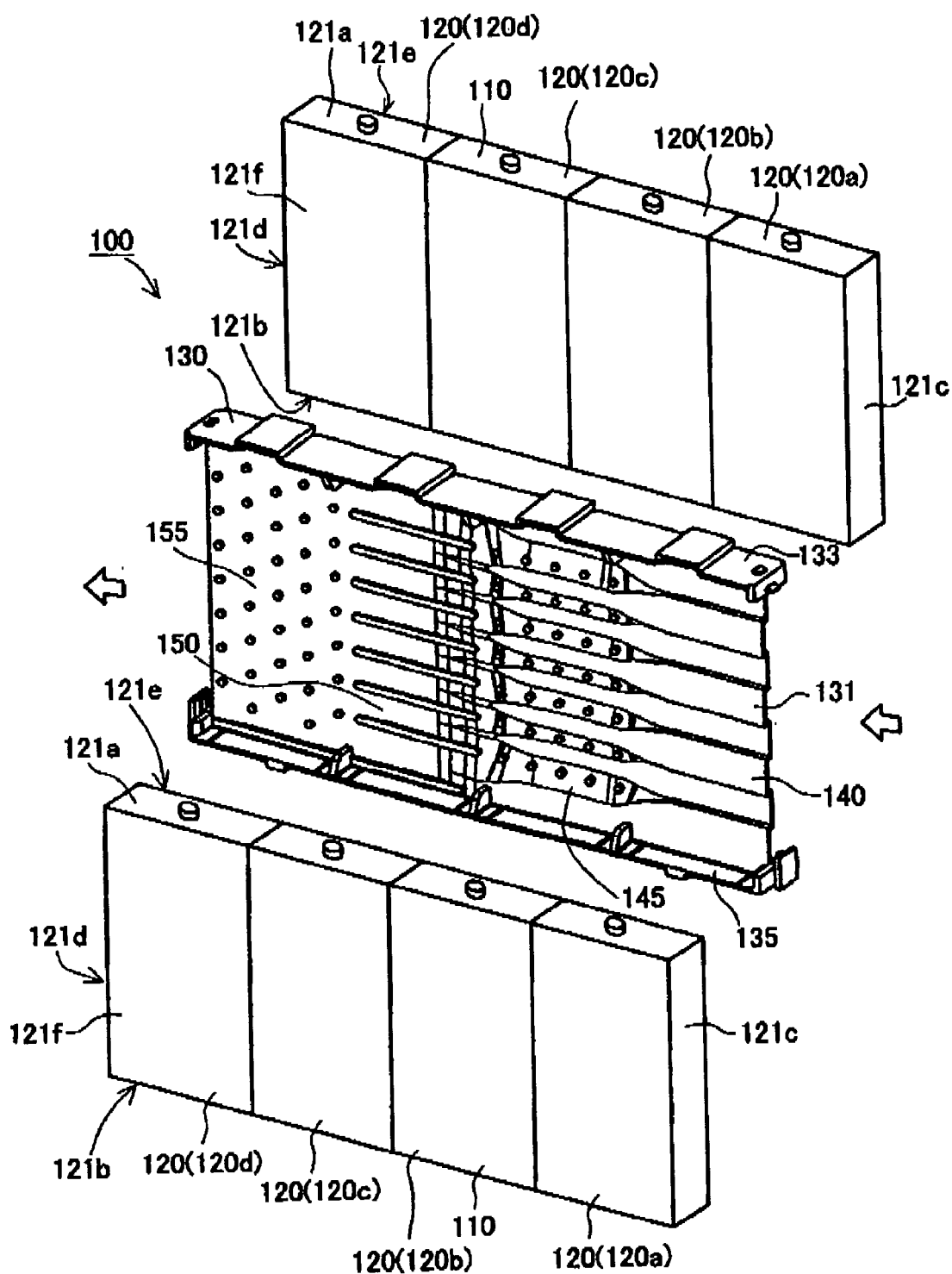
FIG. 1 is an exploded perspective view of a battery pack directed to an embodiment.
Figure 2:
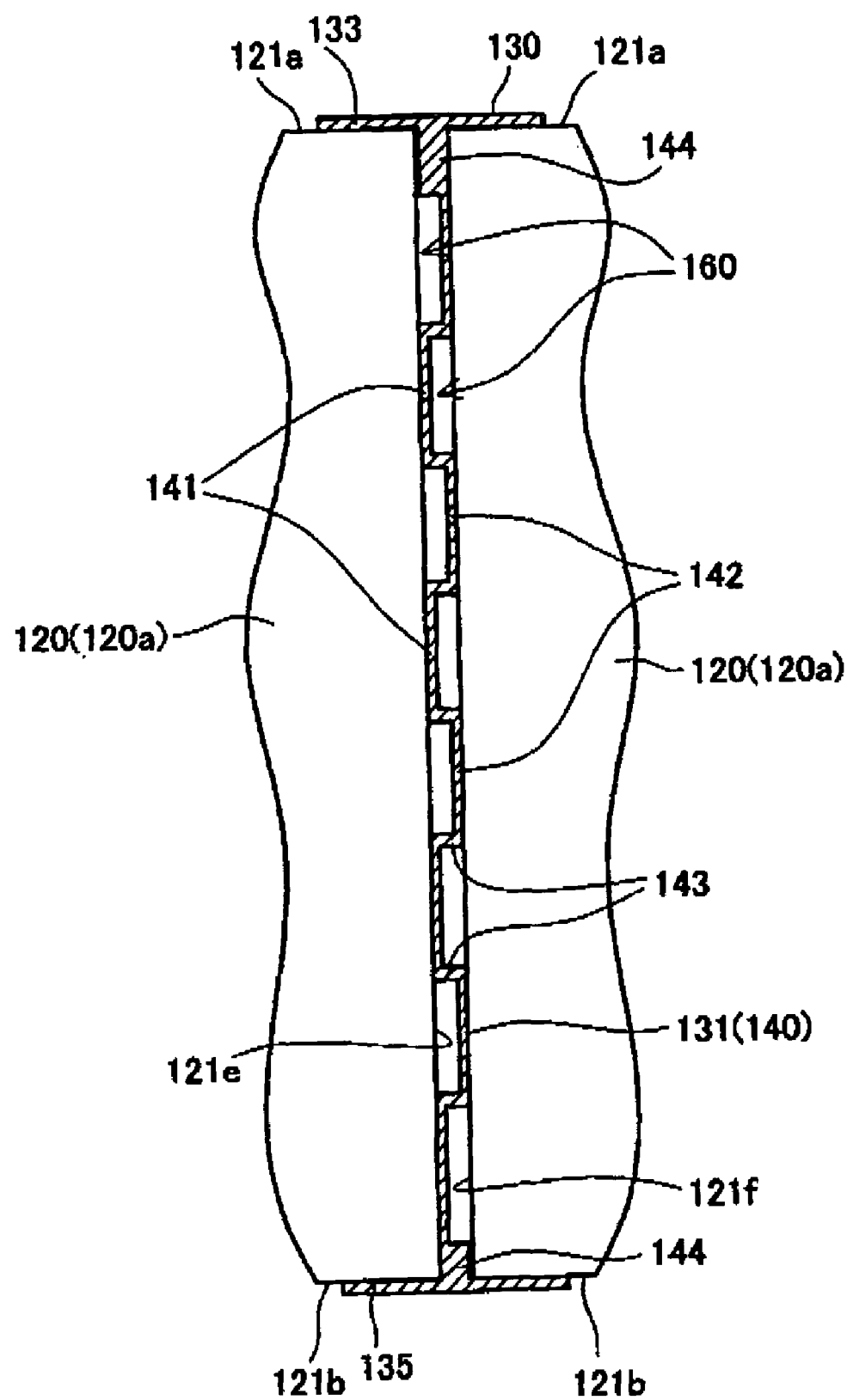
FIG. 2 is a segmentary cross-sectional view corresponding to cross section A-A of the battery pack directed to the embodiment, shown in FIG. 7.
Figure 3:
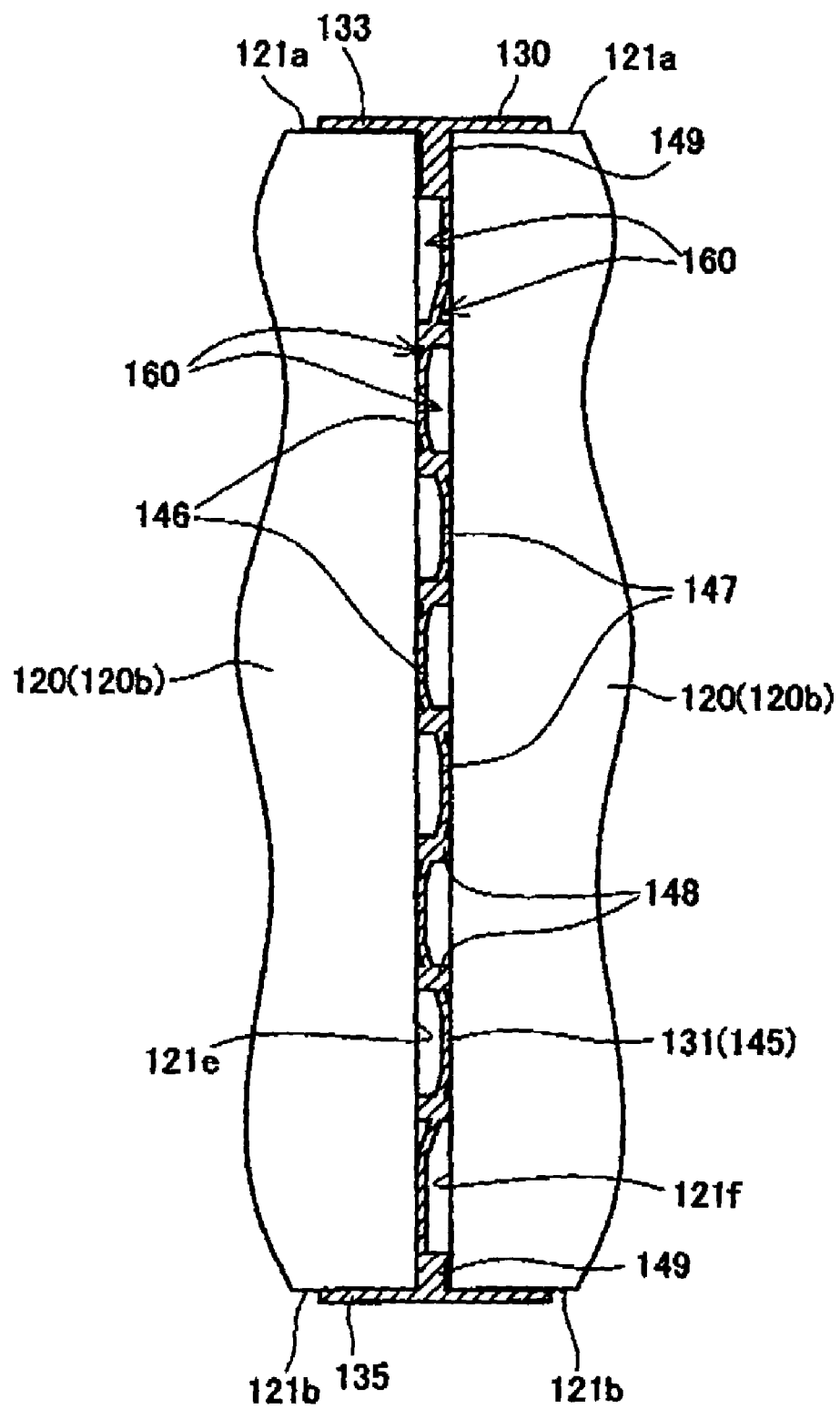
FIG. 3 is a segmentary cross-sectional view corresponding to cross section B-B of the battery pack directed to the embodiment, shown in FIG. 7.
Figure 4:
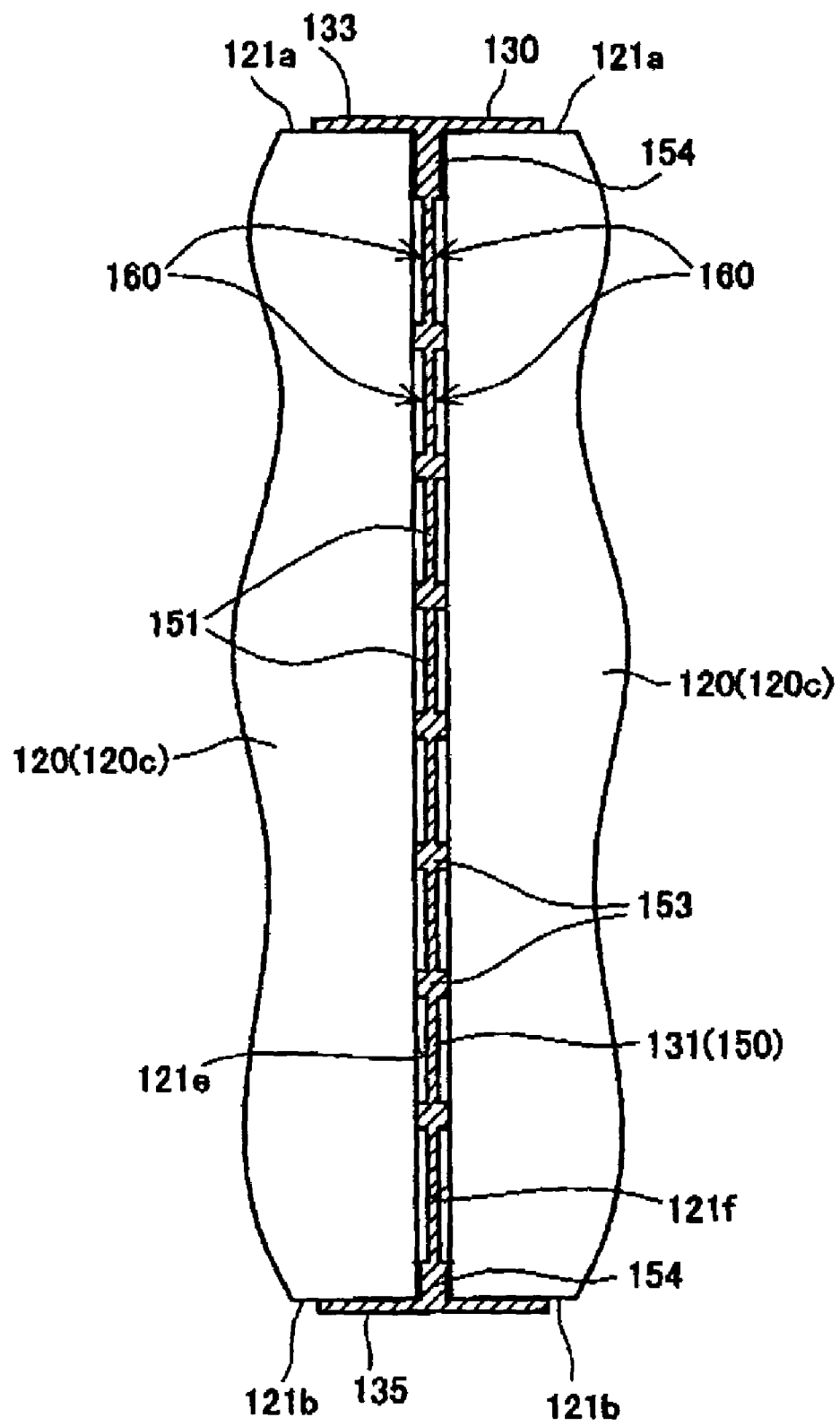
FIG. 4 is a segmentary cross-sectional view corresponding to cross section C-C of the battery pack directed to the embodiment, shown in FIG. 7.
Figure 5:
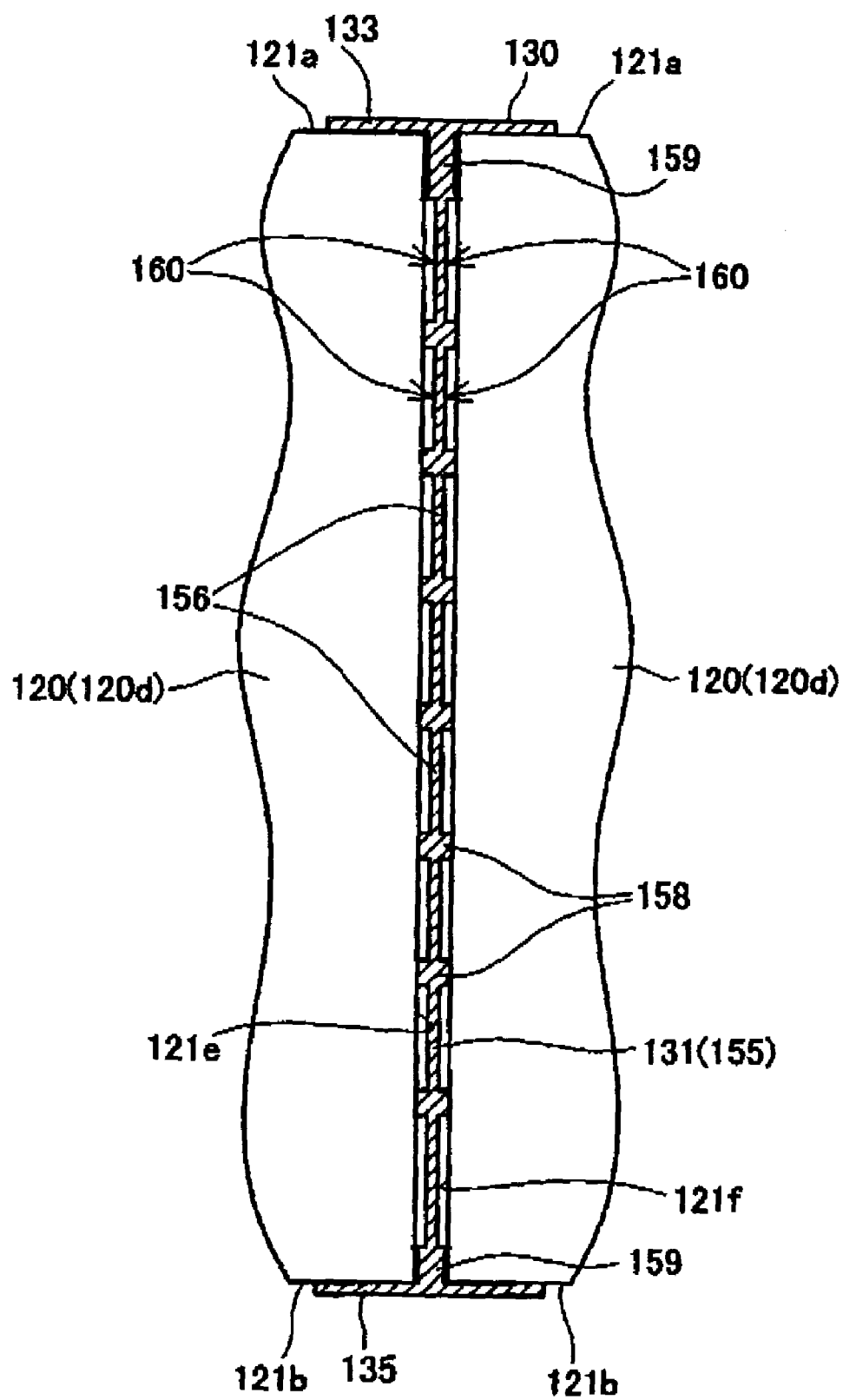
FIG. 5 is a segmentary cross-sectional view corresponding to cross section DD of the battery pack directed to the embodiment, shown in FIG. 7.
Figure 6:
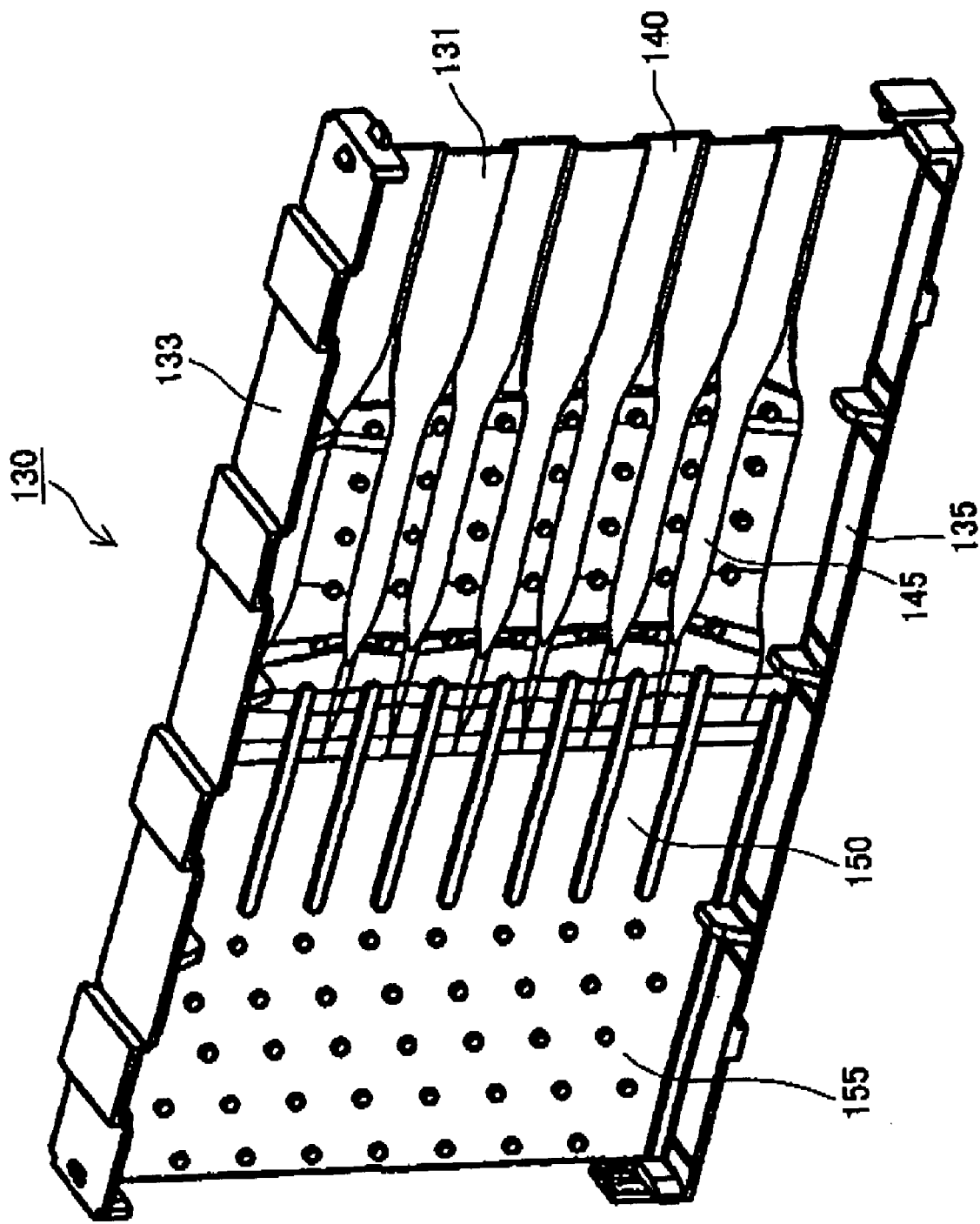
FIG. 6 is a perspective view of a spacer directed to the embodiment.
Figure 7:
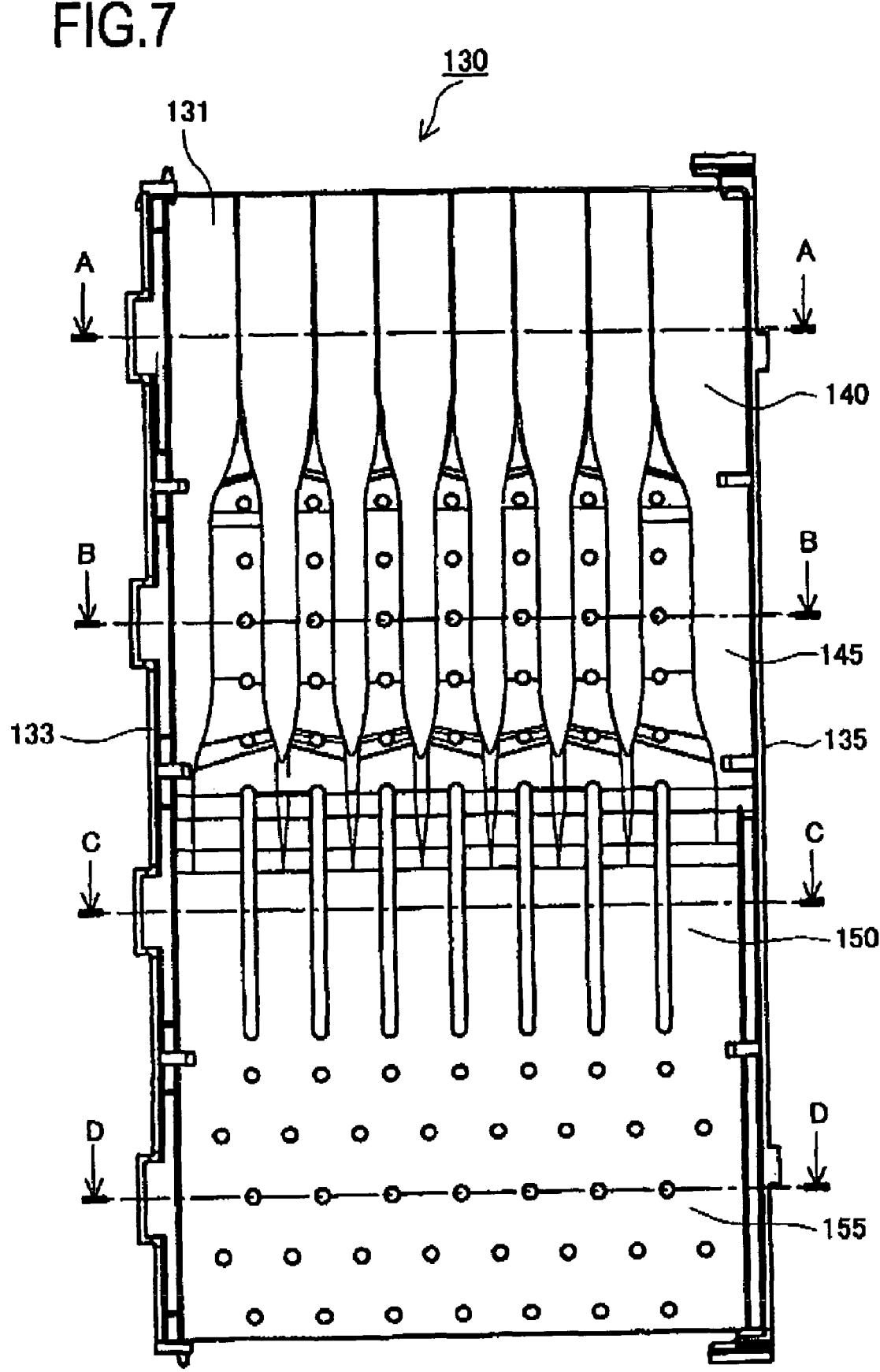
FIG. 7 is a plane view of the spacer directed to the embodiment.
Figure 8:
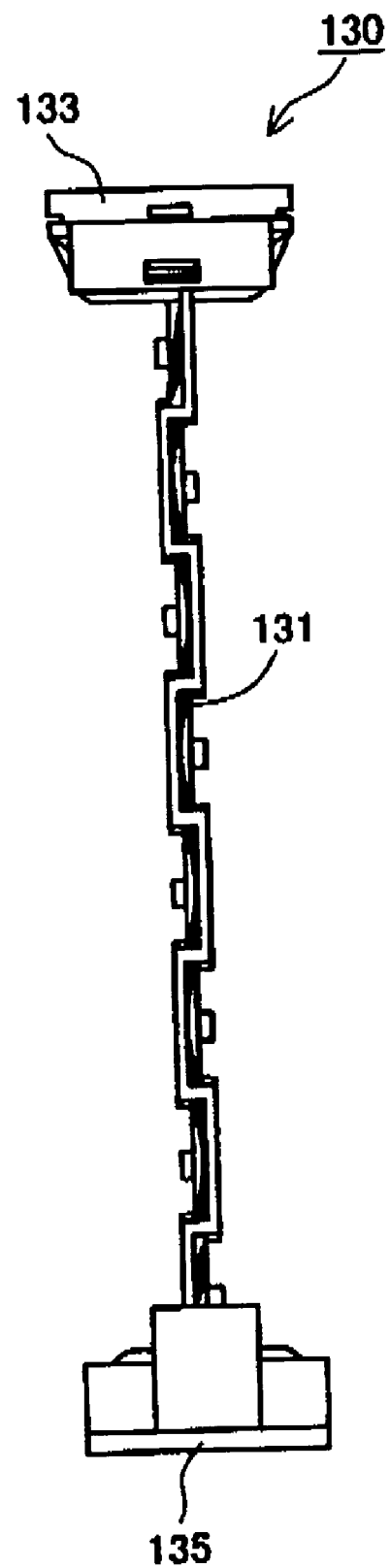
FIG. 8 is a side view of the spacer directed to the embodiment.
Figure 9:
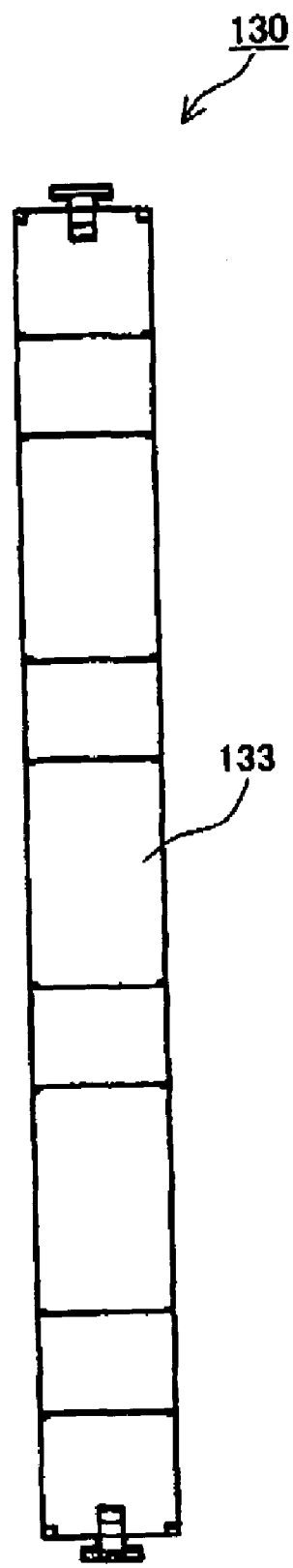
FIG. 9 is a top view of the spacer directed to the embodiment.
Figure 10:
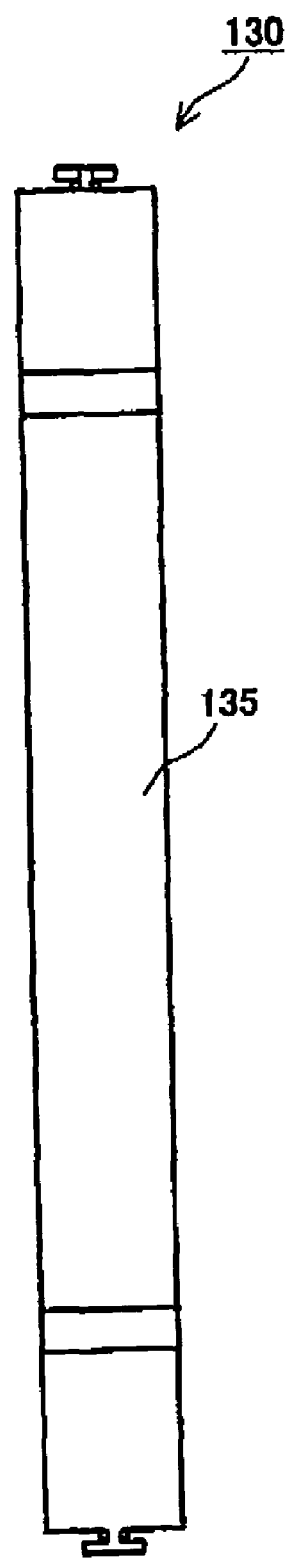
FIG. 10 is a bottom view of the spacer directed to the embodiment.

A detailed description of a preferred embodiment of the inventive battery pack will be described by referring to the accompanying drawings. FIG. 1 is an exploded perspective view of a battery pack 100 directed to the embodiment. FIG. 2 is a segmentary cross-sectional view corresponding to cross section A-A of the battery pack 100 shown in FIG. 7. FIG. 3 is a segmentary cross-sectional view corresponding to cross section B-B of the battery pack 100 shown in FIG. 7. FIG. 4 is a segmentary cross-sectional view corresponding to cross section C-C of the battery pack 100 shown in FIG. 7, FIG. 5 is a segmentary cross-sectional view corresponding to cross section D)-D of the battery pack 100 shown in FIG. 7. Further on, FIG. 6 is a perspective view of a spacer 130. FIG. 7 is a plane view of the spacer 130. FIG. 8 is a side view of the spacer 130. FIG. 9 is a top view of the spacer 130. FIG. 10 is a bottom view of the spacer 130.

The battery pack 100 is a secondary battery (nickel hydride battery, for example) used as power source for battery cars and hybrid cars. The battery pack 100 has plural battery modules 110 (only two battery modules 110 are shown for simplification in FIG. 1). The spacer 130 intervenes between each of adjoining battery modules 110 for flowing cooling medium (air in the present embodiment), (see FIG. 1).

Each of the battery modules 110 is rectangular parallelepiped (see FIG. 1). Each battery module 110 is constituted with plural unit cells 120 (four unit cells in the embodiment) arranged in a row.

The unit cell 120 is a sealed-type secondary battery. The unit cell 120 has a rectangular parallelepiped shape and includes a unit cell case 121, a not-shown electrical element housed in the case 121, and electrolyte solution filled in the case 121.

The cell unit case 121 has six rectangular surfaces: a top surface 121a (upper side in FIG. 1); a bottom surface 121b (lower side in FIG. 1); two of first side surfaces 121c, 121d which connect narrow sides of the top surface 121a and the bottom surface of 121b; and two of second side surfaces 121e, 121f which connect longer sides of the top surface 121a and the bottom surface of 121b. The second aide surfaces 121e, 121f are larger than the first side surfaces 121c, 121d.

Plural unit cell cases 121 integrated in a battery module 110 are arranged in a series such that: each of their top surfaces 121a faces in a same direction; a first side surface 121c of a unit cell case and a first side surface adjoining cell unit case face each other; and second side surfaces 121e, 121f, larger than the first side surfaces 121a, 121b, face outward (see FIG. 1). Accordingly, there is not arranged a unit cell case 121 to be grouped in same battery module 110 outside of second side surfaces 121e, 121f of each battery module 110.

Adjoining battery modules 110 are arranged such that a second surface 121e of a unit cell case 121 belonging to a battery module 110 faces to a second surface 121f of a unit cell 121 belonging to adjoining battery module 110 taking a space (see FIG. 1).

Next, there will be described the spacer 130 (see FIG. 1 through FIG. 10). The spacer 130 is made of electric insulating resin. The spacer 130 intervenes between adjoining battery modules 110 to constitute a cooling passage 160 where cooling medium touches each unit cell case 121 of those battery modules 110 and flows between the battery modules 110 (see FIG. 2 through FIG. 5).

The spacer 130 is structured such that cooling medium flows in a row direction (right-and-left direction in FIG. 1, paper sheet's front-and-back direction in FIG. 2 through FIG. 5) of unit cell cases 121 belonging to the battery module 110. Furthermore, as going from inlet side (right side in FIG. 1) to outlet side (left side in FIG. 1) of the cooling passage 160, touch area of cooling medium and unit cell cases 121 on both sides of the spacer 130 is made larger.

To be more specific, the spacer 130 has an intervening portion 131 which directly intervenes at a space between adjoining battery modules 110. Furthermore, the spacer 130 has a spacer top portion 133 arranged on top surfaces of the adjoining battery modules 110 (on top surfaces 121a for unit cell cases 121). And the spacer 130 has a spacer bottom portion 135 arranged on bottom surfaces of the battery modules 110 (bottom surfaces 121b for unit cell cases 121).

An intervening portion 131 of a spacer 130 is roughly classified into four portions: a first portion 140 met with adjoining unit cells 120a arranged at the inlet side of the cooling passage 160: a second portion 145 met with adjoining unit cells 120b at the second place from the inlet side; a third portion 150 met with adjoining unit cells 120c at the third place from the inlet side; and a fourth portion 155 met with adjoining unit cells 120d at the fourth place from the inlet side (namely, the most outlet side of the cooling passage 160).

As shown in FIG. 2, the first portion 140 for the intervening portion 131 has four of first contact portions 141 extending plate-wise in an up-and-down direction and four of second contact portions 142 also extending plate-wise in an up-and-down direction. Furthermore, the first portion 140 extends in a right-and-left direction in FIG. 2 and comprises: seven of wall-like shaped first anti-narrowing portions 143 which connect a top end of a first contact portion 141 and a bottom end of the first contact portion 141 with a bottom end of a second contact portion 142 and a top end of other second contact portion 142, respectively; and two of wall-like shaped second anti-narrowing portions 144 which intervene between top ends and bottom ends of adjoining unit cell cases 121 without a space.

A first contact portion 141 contacts with a second wall surface 121e for one of sides' unit cells 120a (left side in FIG. 2) surface by surface, as to the unit cells 120a arranged on both sides of the intervening portion 131. Therefore, at this contact portion, cooling medium cannot touch the second side wall surface 121e. Accordingly, it is about a half area of the second side wall surface 121e that cooling medium touches.

On the other hand, a second contact portion 142 contacts with a second wall surface 121f for other side's unit cells 120a (right side in FIG. 2) surface by surface, as to the unit cells 120a arranged on both sides of the intervening portion 131. Therefore, at this contact portion, cooling medium cannot touch the second wall surface 121f. Accordingly, it is about a half area of the second wall surfaces 121f that cooling medium touches.

Furthermore, since the first anti-narrowing portions 143 and the second anti-narrowing portions 144 intervene and prop to secure a space between the adjoining unit cells 120a, width of the cooling passage 160 can be prevented from narrowing even if unit cells 120a expand along charging/discharging.

As shown in FIG. 3, the second portion 145 for the intervening portion 131 has four of first contact portions 146 of which cross-portion is bow-like shape extending in an up-and-down direction and four of second contact portion 147 of which cross-section is also bow-like shape extending in an up-and-down direction. Furthermore, the second portion 145 extends in a right-and-left direction in FIG. 3 and comprises: many columnar first anti-narrowing portions 148 each of which is disposed on the border between a top end of a first contact portion 146 and a bottom end of a second contact portion 147 and on the border between a bottom end of the first contact portion 146 and a top end of other second contact portion 147, respectively; and two of wall-like shaped second anti-narrowing portions 149 which intervene between top ends and bottom ends of adjoining unit cell cases 121 without a space.

A center portion of a first contact portion 146 contacts with a second wall surface 121e for one of sides' unit cells 120b (left side in FIG. 3) surface by surface, as to the unit cells 120b arranged on both sides of the intervening portion 131. Therefore, at this center portion, cooling medium cannot touch the second side wall surface 121e. On the other hand, since cooling passage 160 can be taken at the upper and lower of the center portion, cooling medium can touch thereat. Accordingly, touch area in the second wall surface 121e for the unit cells 120b where cooling medium touches is made larger than touch area in the second wall surfaces 121e for the unit cells 120a.

On the other hand, a center portion of the second contact portion 147 contacts with a second wall surface 121f for one of sides' unit cells 120b (right side in FIG. 3) surface by surface, as to unit cells 120b arranged on both sides of the intervening portion 131. Therefore, at this center portion, cooling medium cannot touch the second side wall surface 121f. On the other hand, since a cooling passage 160 can be taken at the upper and lower of the center portion, cooling medium can touch thereat. Accordingly, touch area in the second wall surface 121f for one of the unit cells 120b where cooling medium touches is made larger than touch area in the second wall surface 121f for one of the unit cells 120a. Furthermore, since the first anti-narrowing portions 148 and the second anti-narrowing portions 149 intervene and prop to secure a space between adjoining unit cells 120b, width of the cooling passage 160 can be prevented from narrowing even if unit cells 120b expand along charging/discharging.

As shown in FIG. 4, the third portion 150 for the intervening portion 131 has plate-like portion 151 plate-wise extending from top end to bottom end in an up-and-down direction, seven of contact portions 153 extending in a right-and-left direction in FIG. 5 from the plate-like portion 151 and also extending in a row direction of the unit cells 120, and two of anti-narrowing portions 154 one of which and another one of which linking to the top end and the bottom end of the plate-like portion 151, respectively.

The plate-like portion 151 intervenes at center of a space between unit cells 120c arranged both sides of the intervening portion 131 without contacting with those second wall surfaces 121e, 121f.

A contact portion 153 contacts with a second wall surface 121e for one of sides' unit cells 120c (left side in FIG. 4), as to unit cells 120c arranged on both sides of the intervening portion 131. Therefore, at this contact portion, cooling medium cannot touch the second side wall surface 121e. On the other hand, since cooling passage 160 can be taken at the upper and lower of the contact portion, cooling medium can touch thereat. Accordingly, touch area in the second wall surfaces 121e for the unit cells 120c where cooling medium touches is made even larger than touch area in the second wall surfaces 121e for the unit cells 120b.

Furthermore, the contact portion 153 contacts with a second wall surface 121f for one of sides' unit cells 120c (right side in FIG. 4), as to unit cells 120c arranged on both sides of the intervening portion 131. Therefore, at this contact portion, cooling medium cannot touch the second side wall surface 121f. On the other hand, since a cooling passage 160 can be taken at the upper and lower of the contact portion, cooling medium can touch thereat. Accordingly, touch area in the second wall surface 121f for the unit cells 120c where cooling medium touches is made even larger than touch area in the second wall surface 121f for one of the unit cells 120b.

Furthermore, since the contact portion 153 (corresponding to the anti-narrowing portion directed to the present invention) and the anti-narrowing portions 154 intervene and prop to secure a space between adjoining unit cells 120c, width of the cooling passage 160 can be prevented from narrowing even if unit cells 120c expand along charging/discharging.

As shown in FIG. 5, the fourth portion 155 for the intervening portion 131 has a plate-like portion 156 plate-wise extending from top end to bottom end in an up-and-down direction, significant number of contact portions 158 protruding both sides from the plate-like portion 156 in a right-and-left direction in FIG. 5, and two of anti-narrowing portions 159 one of which and another one of which linking to the top end and the bottom end of the plate-like portion 156, respectively.

The plate-like portion 156 intervenes at center of a space between unit cells 120d arranged both sides of the intervening portion 131 without contacting with those second wall surfaces 121e, 121f.

A contact portion 158 contacts with A second wall surface 121e for one of sides' unit cells 120d (left side in FIG. 5), as to unit cells 120d arranged on both sides of the intervening portion 131. Therefore, at this contact portion, cooling medium cannot touch the second side wall surfaces 121e. On the other hand, since cooling passage 160 can be taken at portions other than the contact portion, cooling medium can touch thereat. Accordingly, touch area in the second wall surfaces 121e for the unit cells 120d where cooling medium touches is made even larger than touch area in the second wall surfaces 121e for the unit cells 120c.

Furthermore, the contact portion 158 contacts with a second wall surface 121f for one of sides' unit cells 120d (right side in FIG. 5), as to unit cells 120d arranged on both sides of the intervening portion 131. Therefore, at this contact portion, cooling medium cannot touch the second side wall surfaces 121f. On the other hand, since a cooling passage 160 can be taken at portions other than the contact portion, cooling medium can touch thereat. Accordingly, touch area in the second wall surfaces 121f for the unit cells 120d where cooling medium touches is made even larger than touch area in the second wall surfaces 121f for the unit cells 120c.

Furthermore, since the contact portion 158 (corresponding to the anti-narrowing portion directed to the present invention) and the anti-narrowing portions 159 intervene and prop to secure a space between adjoining unit cells 120d, width of the cooling passage 160 can be prevented from narrowing even if unit cells 120d expand along charging/discharging.

This battery pack 100 is structured such that unit cells 120 manufactured by well-known method are arranged in a row to constitute plural battery modules 110, and a spacer 130 is provided to intervene between adjoining battery modules 110. Thereby, the battery pack 100 can be manufactured readily by binding the entirety of battery modules 110 from outside with well-known method.

In the battery pack 100 directed to the present embodiment, the spacer 130 for forming the cooling passage 160 between adjoining battery modules 110 is designed to intervene. The spacer 130 is provided to make cooling medium flow in a row direction of unit cell cases 121 belonging to a battery module 110. Therefore, there is no need to provide a passage for cooling medium at upper portion of a battery pack like conventional one, whereby shortening of the battery pack 100 can be realized.

Furthermore, the spacer 130 is designed such that touch area of cooling medium and unit cell cases 121 becomes larger as going from inlet side to outlet side of the cooling passage 160 (i.e., contact area of the spacer 130 and the unit cell cases 121 becomes smaller). Therefore, as unit cells 120 are arranged closer to the inlet side of the cooling passage 160, comparatively smaller touch area is required to cool down with the cooling medium in comparatively low temperature, and as unit cells 120 are arranged closer to the outlet side of the cooling passage 160, comparatively larger touch area is required to cool down with the cooling medium in warmed-up state. Therefore, each of the unit cells 120 can be cooled down uniformly regardless of unit cell's location.

In the embodiment, as to the cooling passage 160, its cross-sectional area orthogonal to the row direction is made generally constant from the inlet side to the outlet side. More specifically, in case the cross-sectional area at the inlet of the cooling passage 160 is based as 100%, any part of the cross-sectional area of the cooling passage 160 is within a range between 90% and 110%. Therefore, the flow of cooling medium becomes smooth and ability to cool down the unit cells 120 can be improved.

Furthermore, each unit cell case 121 is made of metal while the spacer 130 has electrical insulation characteristics. Therefore, short-circuit between adjoining unit cells 120 can surely be avoided.

Furthermore, in the present embodiment, the spacer 130 intervenes between adjoining unit cell cases 121 and the spacer 130 has the anti-narrowing portions 143, 144, 148, 149, 153, 154, 158, and 1.59 which prevent the cooling passage 160 from narrowing due to expansion of the unit cell cases 121 when the unit cell cases 121 expand. Therefore, even though unit cells 120 expand due to charging/discharging, the spacer 130's anti-narrowing portions 143, . . . 159 can prevent the cooling passage 160 from narrowing. Thereby, the flow of cooling medium can surely be secured and ability to cool down each unit cell 120 can be improved.

While the presently preferred embodiment of the present invention has been shown and described, it is to be understood that this disclosure is for the purpose of illustration and that various changes and modifications may be made without departing from the scope of the invention as set forth in the appended claims.

In the present embodiment, a battery module 110 consists of four of unit cells 120, however, the number of unit cells is not restricted to two as long as the number is two or more. Accordingly, a battery module 110 may be structured with two, or three, or more than five of unit cells arranged in a row.

What is claimed is:

1. A battery pack comprising: plural battery modules comprising at least first and second battery modules, each of which comprises a row of plural unit cells, the battery modules being arranged such that unit cell cases of the unit cells integrated in the first battery module face unit cell cases of unit cells integrated in the adjoining second battery module across a space; and a spacer intervening between the adjoining first and second battery modules, the spacer defining a cooling passage between an inlet side and an outlet side of the adjoining first and second battery modules which allows cooling medium flowing between the adjoining first and second battery modules to touch a plurality of the unit cell cases of the adjoining first and second battery modules, wherein the spacer is structured such that:

the cooling medium flows in the cooling passage between the unit cell cases belonging to the first and second battery modules from the inlet side to the outlet side, and a first cooling medium contact area is defined between the cooling medium and the inlet side unit cell cases, the first cooling medium contact area having a first width, and a second cooling medium contact area is defined between the cooling medium and the outlet side unit cell cases, the second cooling medium contact area having a second width, wherein the second width is greater than the first width.

2. A battery pack according to claim 1, wherein as to the cooling passage, cross-sectional area orthogonal to the row direction is made generally constant from the inlet side to the outlet side.

3. A battery pack according to claim 1, wherein as to each of the unit cell cases, at least one portion facing the cooling passage is made of metal, and the spacer has electrical insulation characteristics.

4. A battery pack according to claim 1, wherein the spacer has an anti-narrowing portion which prevents the cooling passage from narrowing due to expansion of the unit cell cases when the unit cell cases expand.

5. A battery pack comprising:

plural battery modules comprising at least first and second battery modules, each of which comprises a row of plural unit cells, the battery modules being arranged such that unit cell cases of the unit cells integrated in the first battery module face unit cell cases of the unit cells integrated in the adjoining second battery module across a space; and a spacer intervening between the adjoining first and second battery modules, the spacer defining a cooling passage between an inlet side and an outlet side of the adjoining first and second battery modules which allows cooling medium flowing between the adjoining first and second battery modules to touch a plurality of the unit cell cases for the adjoining battery modules, and the spacer touching other areas of the unit cell cases, defining a plurality of spacer contact areas, wherein the spacer is structured such that:

the cooling medium flows in the cooling passage from the inlet side to the outlet side of the unit cell cases belonging to the first and second battery modules, and the spacer contact areas between the spacer and the unit cell cases are smaller at the outlet side then at the inlet side of the cooling passage.

6. A battery pack according to claim 5, wherein as to the cooling passage, cross-sectional area orthogonal to the row direction is made generally constant from the inlet side to the outlet side.

7. A battery pack according to claim 5, wherein as to each of the unit cell cases, at least one portion facing the cooling passage is made of metal, and the spacer has electrical insulation characteristics.

8. A battery pack according to claim 5, wherein the spacer has an anti-narrowing portion which prevents the cooling passage from narrowing due to expansion of the unit cell cases when the unit cell cases expand.

9. A battery pack according to claim 1, wherein the spacer includes a plurality of adjacent spacer portions arranged in series along the cooling passage between the inlet side and the outlet side, wherein each successive spacer portion has a larger cooling medium contact area and a smaller spacer contact area than an adjacent spacer portion in an upstream direction relative to the cooling passage from the inlet side to the outlet side.

10. A battery pack according to claim 9, wherein the plurality of spacer portions comprise a first spacer portion defining a plurality of generally rectangular cooling medium contact areas.

11. A battery pack according to claim 10, wherein the plurality of spacer portions comprise a second spacer portion comprising a plurality of generally convex cooling medium contact areas.

12. A battery pack according to claim 11, wherein the plurality of spacer portions comprises a third spacer portion comprising a vertical spacer wall with a plurality of spaced cross walls, said cross walls contacting the battery modules.

\* \* \* \* \*

UNITED STATES PATENT AND TRADEMARK OFFICE
CERTIFICATE OF CORRECTION

PATENT NO. : 7,504,799 B2  Page 1 of 1
APPLICATION NO. : 11/218622
DATED : March 17, 2009
INVENTOR(S) : Shinji Hamada et al.

It is certified that error appears in the above-identified patent and that said Letters Patent is hereby corrected as shown below:

On the Title Page
Item [57], Abstract, line 10, "lager" should read --larger--.

Claim 5, col. 11, line 13, "then" should read --than--.

Signed and Sealed this

Nineteenth Day of May, 2009

JOHN DOLL
*Acting Director of the United States Patent and Trademark Office*